United States Patent [19]

Tajima et al.

[11] Patent Number: 4,668,550
[45] Date of Patent: May 26, 1987

[54] OPTICAL DISC

[75] Inventors: Tetsuo Tajima; Hiroaki Miwa, both of Fujisawa; Ryoichi Sudo, Yokosuka; Shinkichi Horigome, Tachikawa, all of Japan

[73] Assignees: Hitachi, Ltd., Tokyo; Hitachi Maxell, Ltd., Osaka, both of Japan

[21] Appl. No.: 879,013

[22] Filed: Jun. 26, 1986

[30] Foreign Application Priority Data

Aug. 28, 1985 [JP] Japan .................. 60-187280
Apr. 9, 1986 [JP] Japan .................. 61-80130

[51] Int. Cl.$^4$ .................. B32B 1/00; G01D 15/14
[52] U.S. Cl. .................. 428/65; 430/270; 430/945; 427/54.1; 346/135.1; 346/137; 369/284; 369/286; 369/288; 428/425.8

[58] Field of Search .................. 428/65, 425.8; 430/270, 430/945; 346/135.1, 137; 369/284, 286, 288; 427/54.1

[56] References Cited

U.S. PATENT DOCUMENTS 4,456,659 6/1984 Sudo et al. .................. 428/447

Primary Examiner—Alexander S. Thomas
Attorney, Agent, or Firm—Antonelli, Terry & Wands

[57] ABSTRACT

Optical discs obtained by using as a primer layer formed on a transparent substrate and under a metal-made recording film a cured ultraviolet-curable resin composition comprising (a) a reaction product of isophorone diisocyanate or the like and an acrylate or methacrylate, (b) a diacrylate or dimethacrylate and (c) a photopolymerization initiator are excellent in recording sensitivity, moisture resistance, heat resistance, adhesive properties, reliability, etc.

9 Claims, 2 Drawing Figures

OPTICAL DISC

BACKGROUND OF THE INVENTION

This invention relates to optically readable information discs (or simply optical discs) such as digital audio discs, optical video discs, memory discs, etc., read out by light.

Figure 1:
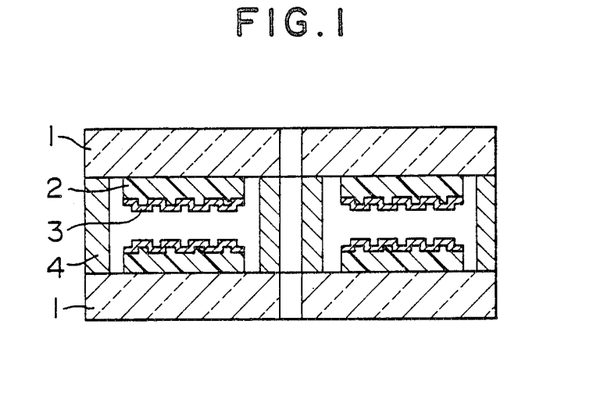
FIG. 1 is a cross-sectional view of an optical disc.

Optical discs are formed, for example as shown in FIG. 1, by placing oppositely two optical disc base plates comprising a transparent substrate 1 such as a glass plate, a transparent plastic plate (made from poly(methyl methacrylate), polycarbonate, etc.), a primer layer 2 formed on the substrate 1 and having groove-like and hole-like depressions and protuberances for servo tracks, and a metal-made recording film 3 formed on the primer layer 2 using such a metal as Bi, In, Te, Se, As, Pb, Sn or the like, so as to face the recording films 3 each other using a spacer 4 with a predetermined distance, and bonding the spacer and the transparent substrates with an adhesive (not shown in the drawing). Then, the recording film 3 is irradiated with a light beam and the irradiated portion of the metal-made recording film is removed to give information units.

Figure 2:
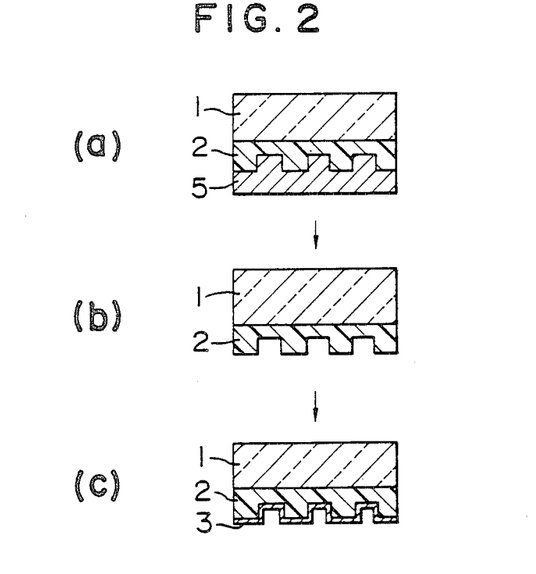
FIGS. 2(a) to 2(c) are cross-sectional views showing a process for producing an optical disc base plate comprising a substrate, a primer layer and a metal-made recording film used in an optical disc.

Such optical discs are produced as shown in FIGS. 2(a) to 2(c). That is, an ultraviolet-curable resin composition is inserted between a stamper 5 made of a metal such as nickel and having predetermined depressions and protuberances, and a transparent substrate 1, followed by curing the resin composition with ultraviolet light to form a primer layer 2 [FIG. 2(a)]. Then, the metal-made stamper 5 is taken off [FIG. 2(b)]. A metal-made recording film 3 is formed on the primer layer having depressions and protuberances [FIG. 2(c)], and two thus formed optical disc base plates (comprising the transparent substrate, the primer layer and the recording film) are placed oppositely so as to face the metal-made recording films each other using spacers with a predetermined distance, followed by bonding the spacers to the optical disc base plates.

The ultraviolet-curable resin composition used for the primer layer mentioned above should satisfy the following conditions:
(a) The cured product is optically transparent.
(b) The resins adheres well to the transparent substrate made from glass, a transparent plastic, or the like.
(c) The resin is easily peeled off from the stamper.
(d) The metal-made recording film is rapidly melted and removed by the irradiation with a light beam to easily give round good holes.
(e) The metal-made recording film is not deformed due to moisture absorption when used for a long period of time, nor generates cracks due to the swelling of the recording film. Further, it should be prevented that a corrosive substance realeased from a cured product due to moisture absorption oxidizes the metal-made recording film to increase the transmittance of the recording film. That is, recorded signals should be read out correctly even under moisture absorbed circumstances.
(f) Thermal stability of grooves with depressions and protuberances on the metal-made recording film obtained by vacuum deposition is excellent without causing changes in grooves' height and shape and without generating cracks.
(g) To have mechanical strength enough to withstand a high-speed revolution of 50 rpm or more is necessary.

But conventional ultraviolet-curable resin compsoitions were not able to satisfy the above-mentioned conditions (a) to (g) at the same time.

A typical example is shown in Japanese Patent Unexamined Publication No. 127946/81.

SUMMARY OF THE INVENTION

It is an object of this invention to provide an optical disc overcoming disadvantages of prior art optical discs and having stabilized properties and function.

This invention provides an optically readable information disc comprising a transparent substrate, a primer layer formed on the substrate and having a relief structure corresponding to information signals to be carried, and a metal-made recording film layer formed on the primer layer, the improvement wherein the primer layer is obtained by curing an ultraviolet-curable resin composition comprising

(a) 20 to 80 parts by weight of a compound of the formula:

wherein $R_1$ is hydrogen or a methyl group; $R_2$ and $R_3$ are independently hydrogen or an alkyl group having 1 to 8 carbon atoms; and $R_4$ is (b) 80 to 20 parts by weight of a compound of the formula:

wherein $R_1$ and $R_5$ are independently hydrogen or a methyl group; and n is an integer of 5 to 12, and (c) a photopolymerization initiator in an amount of 0.1 to 5.0 parts by weight per 100 parts by weight of the total of the components (a) and (b).

DESCRIPTION OF THE PREFERRED EMBODIMENTS

The ultraviolet-curable resin composition used for forming the primer layer comprises (a) a compound of the formula (1), (b) a compound of the formula (2), and (c) a photopolymerization initiator.

The component (a) is a compound of the formula:

(1)

wherein $R_1$ is hydrogen or a methyl group; $R_2$ and $R_3$ are independently hydrogen or an alkyl group having 1 to 8 carbon atoms; and $R_4$ is

-continued

In the definition of $R_4$, the following groups are more preferable:

Examples of the compounds of the formula (1) are follows:

$R^4$ in the formula wherein $R_1$ is H or $CH_3$; and m is zero or an integer of 1 to 8.

$R_4$ in the formula a reaction product of 1,1'-methylenebis(4-isocyanatobenzene) (1 mole) and 2-hydroxyethyl acrylate (2 moles), a reaction product of 1,1'-methylenebis(4-isocyanatobenzene) (1 mole) and 2-hydroxyethyl methacrylate (2 moles);

$R_4$ in the formula a reaction product of 1,1'-methylenebis(4-isocyanatocyclohexane) (1 mole) and 2-hydroxyethyl acrylate (2 moles), a reaction product of 1,1'-methylenebis(4-isocyanatocyclohexane) (1 mole) and 2-hydroxyethyl methacrylate (2 moles), a reaction product of 1,1'-methylenebis(4-isocyanatocyclohexane) (1 mole) and 2-hydroxypropyl acrylate (2 moles), a reaction product of 1,1'-methylenebis(4-isocyanatocyclohexane) (1 mole) and 2-hydroxypropyl methacrylate (2 moles), a reaction product of 1,1'-methylenebis(4-isocyanatocyclohexane) (1 mole) and 2-hydroxybutyl acrylate (2 moles), a reaction product of 1,1'-methylenebis(4-isocyanatocyclohexane) (1 mole) and 2-hydroxybutyl methacrylate (2 moles);

$R_4$ in the formula a reaction product of 2,4-methylcyclohexane diisocyanate (1 mole) and 2-hydroxyethyl acrylate (2 moles), a reaction product of 2,4-methylcyclohexane diisocyanate (1 mole) and 2-hydroxyethyl methacrylate (2 moles);

$R_4$ in the formula a reaction product of 2,2-bis(4-isocyanatocyclohexyl)propane (1 mole) and 2-hydroxybutyl acrylate (2 moles), and a reaction product of 2,2-bis(4-isocyanatocyclohexyl)propane (1 mole) and 2-hydroxybutyl methacrylate (2 moles).

These compounds can be used alone or as a mixture thereof.

The component (b) is a compound of the formula:

$$CH_2=C(R_1)-C(=O)-O-(CH_2)_n-O-C(=O)-C(R_5)=CH_2 \quad (2)$$

wherein $R_1$ and $R_5$ are independently hydrogen or a methyl group; and n is an integer of 5 to 12.

Examples of the compounds of the formula (2) are 1,5-pentanediol diacrylate, 1,5-pentanediol dimethacrylate, 1,6-hexanediol diacrylate, 1,6-hexanediol dimethacrylate, 1,7-heptanediol diacrylate, 1,7-heptanediol dimethacrylate, 1,8-octanediol diacrylate, 1,8-octanediol dimethacrylate, 1,9-nonanediol diacrylate, 1,9-nonanediol dimethacrylate, 1,10-decanediol diacrylate, 1,10-decanediol dimethacrylate, 1,11-dodecanediol diacrylate, 1,11-dodecanediol dimethacrylate, 1,12-undecanediol diacrylate, and 1,12-undecanediol dimethacrylate.

The compounds of the formulae (1) and (2) are used in amounts of 20 to 80 parts by weight, respectively, the total being 100 parts by weight.

When the amount of the compound of the formula (1) is more than 80 parts by weight, mold releasing properties from the stamper, moisture resistance of the cured product and heat resistance are lowered. On the other hand, when the amount of the compound of the formula (1) is less than 20 parts by weight, molding strain due to cure shrinkage becomes large, which results in making the cured product brittle and low in mechanical strength.

As the photopolymerization initiators (c), the following compounds are effective:

Benzils such as benzil, etc.

Benzoins such as benzoin, benzoin methyl ether, benzoin ethyl ether, benzoin isopropyl ether, benzoin isobutyl ether, α-methylbenzoin, etc.

Benzophenones such as 1-hydroxycyclohexyl benzophenone, etc.

Acetophenones such as acetophenone, α,α,α-tribromoacetophenone, etc.

Thioxanthones such as 2-chlorothioxanthone, 2-methylthioxanethone, etc.

Antraquinones such as 2-ethylanthraquinone, 2-methylanthraquinone, etc.

Benzylketals such as benzyl dimethyl ketal, etc.

These photopolymerization initiators can be used alone or as a mixture thereof.

The photopolymerization initiator is used in an amount of 0.1 to 5.0 parts by weight per 100 parts by weight of the total of the compounds of the formulae (1) and (2). If the amount is less than 0.1 part by weight, the reactivity is lowered, which results in lowering various properties of cured products. On the other hand, if the amount is more than 5.0 parts by weight, the reaction rate is too fast to make the generation of heat great, which results in causing cracks on cured products and lowering various properties due to non-uniform curing.

The ultraviolet-curable resin composition may contain one or more acrylates and/or methacrylates in order to adjust the viscosity, hardness and thermal expansion coefficient, to lower the moisture absorption properties, and to improve the peeling properties from the stamper.

Examples of the acrylates and methacrylates are lauryl acrylate, lauryl methacrylate, tridecyl methacrylate, isobornyl acrylate, isobornyl methacrylate, neopentyl glycol diacrylate, trimethylolethane triacrylate, trimethylolethane trimethacrylate, trimethylolpropane triacrylate, trimethylolpropane trimethacrylate, etc.

The acrylate and/or methacrylates are preferably used in an amount of 0 to 40 parts by weight per 100 parts by weight of the total of the compounds of the formulae (1) and (2).

The ultraviolet-curable resin composition may contain one or more silane coupling agents in order to stabilize the adhesive properties of the above-mentioned resin when moisture is absorbed.

Examples of the silane coupling agents are γ-acryloxypropyltrimethoxysilane, γ-methacryloxypropyltrimethoxysilane, vinyltrimethoxysilane, vinyltriethoxysilane, N-β-(N-vinylbenzylamino)ethyl-γ-aminopropyltrimethoxysilane.monohydrogenchloride, etc.

These silane coupling agents are preferably used in an amount of 0 to 6.0 parts by weight per 100 parts by weight of the total of the compounds of the formulae (1) and (2).

Using the ultraviolet-curable resin composition, plastic information-recording media such as optical discs can be produced according to conventional processes.

For example, the ultraviolet-curable resin composition is inserted into a space formed between a stamper 5 made of, e.g., nickel having grooves and pits thereon and a transparent substrate 1 made of, e.g., glass plate, plastic plate, etc., as shown in FIG. 2(a) and pressed at a pressure of 2 to 20 g/cm$^2$, preferably 5 to 15 g/cm$^2$ and exposed to ultraviolet irradiation at 50 to 400 mW/cm$^2$, preferably 100 to 250 mW/cm$^2$, using a high-pressure mercury lamp, xenone lamp, or the like to cure the resin composition.

After curing the resin composition for the primer layer 2, the stamper 5 is removed as shown in FIG. 2(b). Then, a recording film 3 made of a metallic material such as Bi, In, Te, As, Pb, Sn or the like with almost uniform thickness is formed on the surface of the primer layer 2 to give an optical disc base plate integrally formed of the recording film 3, the primer layer 2 and the transparent substrate 1 as shown in FIG. 2(c).

Finally, two optical disc base plates are place in parallel so as to face the primer layer resin sides each other and bonded via spacers 4 with a predetermined space to give a desired optical disc as shown in FIG. 1.

This invention is illustrated by way of the following Examples, in which all parts and percents are by weight unless otherwise specified.

EXAMPLES 1 TO 12,

Comparative Examples 1 to 10

Using ultraviolet-curable resin compositions as listed in Table 1, optical discs as shown in FIG. 1 were produced as follows.

An ultraviolet-curable resin composition was inserted into a space formed between a nickel stamper having grooves and pits thereon and a glass plate having a diameter of 300 mm and a thickness of 1.2 mm, and pressed at 10 g/cm$^2$, followed by curing with ultraviolet irradiation at 150 mW/cm$^2$ (wavelength: 365 nm) for 30 seconds using a high-pressure mercury lamp to form a primer layer. Then, the stamper was removed to give precise replicas of the grooves and pits of the stamper on the primer layer (the cured resin composition). On the surfaces of grooves and pits of the primer layer, a recording film of Te series was formed by a vacuum deposition method in about 250 Å thick to give an optical disc base plate.

Two optical disc base plates were placed in parallel so as to face the recording films each other with a space of about 1 mm and bonded with an epoxy resin adhesive around the peripheries thereof to give an optical disc.

TABLE 1

| Example No. | Component (a) *1 | Component (b) *2 A | Component (b) *2 B | Component (c) *3 | Additive *4 | Additive *5 | Conventional compounds *6 (unit: parts) X | Y | Z |
| --- | --- | --- | --- | --- | --- | --- | --- | --- | --- |
| Example | | | | | | | | | |
| 1 | 60 | 40 | — | 2 | — | — | — | — | — |
| 2 | 60 | — | 40 | 2 | — | — | — | — | — |
| 3 | 20 | 80 | — | 2 | — | — | — | — | — |
| 4 | 80 | 20 | — | 2 | — | — | — | — | — |
| 5 | 20 | — | 80 | 2 | — | — | — | — | — |
| 6 | 80 | — | 20 | 2 | — | — | — | — | — |
| 7 | 60 | 40 | — | 2 | 10 | — | — | — | — |
| 8 | 60 | — | 40 | 2 | 10 | — | — | — | — |

TABLE 1-continued

| | | Component (b) *2 | | | Additive | | (unit: parts) Conventional compounds *6 | | |
|---|---|---|---|---|---|---|---|---|---|
| Example No. | Component (a) *1 | A | B | Component (c) *3 | *4 | *5 | X | Y | Z |
| 9 | 60 | 40 | — | 1 | — | — | — | — | — |
| 10 | 60 | — | 40 | 1 | — | — | — | — | — |
| 11 | 60 | 40 | — | 2 | — | 1 | — | — | — |
| 12 | 60 | — | 40 | 2 | — | 1 | — | — | — |
| Comparative Example | | | | | | | | | |
| 1 | 10 | 90 | — | 2 | — | — | — | — | — |
| 2 | 90 | 10 | — | 2 | — | — | — | — | — |
| 3 | 10 | — | 90 | 2 | — | — | — | — | — |
| 4 | 90 | — | 10 | 2 | — | — | — | — | — |
| 5 | 60 | 40 | — | 0.05 | — | — | — | — | — |
| 6 | 60 | 40 | — | 6.0 | — | — | — | — | — |
| 7 | — | — | — | 2 | — | — | 50 | — | 50 |
| 8 | — | — | — | 2 | — | — | — | 50 | 50 |
| 9 | — | — | — | 2 | 10 | — | 50 | — | 50 |
| 10 | — | — | — | 2 | 10 | — | — | 50 | 50 |

Note on Table 1:

*1:

*2: A:

B:

*3: Benzoin isopropyl ether (photopolymerization initiator)
*4: Isobornyl methacrylate (viscosity lowering agent)
*5: γ-Methacryloxypropyltrimethoxysilane (silane coupling agent)

*6: X:  (molecular weight: aboout 400)

Y:

Z: $CH_2=CH-\underset{\underset{O}{\|}}{C}-O-CH_2-\underset{\underset{CH_3}{|}}{\overset{\overset{CH_3}{|}}{C}}-CH_2-O-\underset{\underset{O}{\|}}{C}-CH=CH_2$ The optical discs thus produced and the ultraviolet-curable resin compositions were subjected to the following tests.

(1) Recording Sensitivity

Using an optical disc, signals were recorded. The Te series recording film was irradiated with a laser light beam under the following conditions to give a round hole with about 1 μm in diameter by melting, followed by removing. A hole which was good and bearable for practical use was evaluated as "o" and one which was unbearable for practical use was elevated as "x".

Disc revolution number: 960 rpm,
Recording frequency: 2.5 MHz,
Semiconductor laser: wavelength 830 nm,
Recording power: about 7 mW (at film surface).

(2) Moisture Resistance

An optical disc was allowed to stand in a chamber kept at 60° C. and 95% RH for 100 hours and evaluated.

An optical disc which was not suffered from deformation of grooves of metal-made recording films, an increase of transmittance of the recording film due to oxidation of the recording film caused by a corrosive substance released from a cured resin composition, and was bearable for practical use was evaluated as "o", and one which was suffered from at least one of the changes mentioned above and was unbearable for practical use was evaluated as "x".

(3) Heat Resistance

An optical disc was allowed to stand in a chamber kept at 100° C. for 4 hours.

An optical disc which was excellent in thermal stability without causing changes in the depth and shape of the grooves with a relief structure obtained by vapor deposition of metal, causing no cracks on the recording film, and was bearable for practical use was evaluated as "o", and one which was suffered from at least one the changes mentioned above and was unbearable for practical use was evaluated as "x".

(4) Light Transmittance

A resin plate of 1 mm thick was formed and the light transmittance of the resin plate with a light of 830 nm was measured by using a spectrophotometer.

(5) Tensile Strength

A cured resin product was subjected to a tensile test according to JIS K 6911 in order to give a measure for judging mechanical strength of optical discs bearable for high-speed revolution of 500 rpm or more.

(6) Adhesive Properties

After allowing an optical disc to stand in a chamber kept at 60° C. and 95% RH for 100 hours, or after heating an optical disc at 100° C. for 4 hours, adhesiveness between the resin and a transparent substrate made from glass or a transparent plastic (e.g. epoxy resin, acrylic resin) was evaluated with the mark "o" (no problem in practical use) and the mark "x" (there is a problem in practical use).

The results are shown in Table 2.

parative Examples 5 and 6, not only the moisture resistance but also the heat resistance, tensile strength and adhesive properties are remarkably poor.

Further, when the compounds other than those claimed in this invention are used, the recording sensitivity, moisture resistance, heat resistance and adhesive properties are remarkably poor as shown in Comparative Examples 7 and 9, while the recording sensitivity, moisture resistance and heat resistance are remarkably poor as shown in Comparative Examples 8 and 10.

TABLE 2

| Example No. | Recording sensitivity | Moisture resistance | Heat resistance | Light transmittance (%) | Tensile strength (MPa) | Adhesive properties |
|---|---|---|---|---|---|---|
| Example |  |  |  |  |  |  |
| 1 | o | o | o | 86 | 46 | o |
| 2 | o | o | o | 88 | 47 | o |
| 3 | o | o | o | 87 | 46 | o |
| 4 | o | o | o | 89 | 48 | o |
| 5 | o | o | o | 88 | 46 | o |
| 6 | o | o | o | 87 | 47 | o |
| 7 | o | o | o | 89 | 47 | o |
| 8 | o | o | o | 87 | 48 | o |
| 9 | o | o | o | 88 | 46 | o |
| 10 | o | o | o | 87 | 47 | o |
| 11 | o | o | o | 88 | 48 | o |
| 12 | o | o | o | 89 | 46 | o |
| Comparative Example |  |  |  |  |  |  |
| 1 | o | o | o | 87 | 30 | o |
| 2 | o | x | x | 86 | 46 | o |
| 3 | o | o | o | 88 | 32 | o |
| 4 | o | x | x | 89 | 46 | o |
| 5 | o | x | x | 88 | 31 | x |
| 6 | o | x | x | 86 | 32 | x |
| 7 | x | x | x | 85 | 47 | x |
| 8 | x | x | x | 89 | 46 | o |
| 9 | x | x | x | 88 | 48 | x |
| 10 | x | x | x | 86 | 47 | o |

As is clear from the results of Table 2, when the amount of the compound of the formula (1) is lower than 20 parts as shown in Comparative Examples 1 and 3, the tensile strength is worse and brittle. On the other hand, when the amount of the compound of the formula (1) is more than 80 parts, the moisture resistance and heat resistance are worse and the mold release properties from the stamper are also bad.

When the amount of photopolymerization initiator is lower or more than the claimed range as shown in Com-

EXAMPLES 13 TO 34

Comparative Examples 11 to 22

Using ultraviolet-curable resin compositions as listed in Table 3, optical discs were produced in the same manner as described in Example 1.

Various properties as shown in Table 5 were tested in the same manner as described in Example 1 and the results were shown in Table 5.

TABLE 3

(unit: parts)

| Example No. | Component (a) *1 | | | | | | | | | | Component (b) *2 | | | | Component (c) *3 | Additive | | Conventional compounds *6 | | |
|---|---|---|---|---|---|---|---|---|---|---|---|---|---|---|---|---|---|---|---|---|
|  | K | L | C | D | E | F | G | H | I | J | A | B | M | N |  | *4 | *5 | X | Y | Z' |
| Example |  |  |  |  |  |  |  |  |  |  |  |  |  |  |  |  |  |  |  |  |
| 13 | 50 | — | — | — | — | — | — | — | — | — | 50 | — | — | — | 2 | — | — | — | — | — |
| 14 | — | 50 | — | — | — | — | — | — | — | — | 50 | — | — | — | 2 | — | — | — | — | — |
| 15 | — | — | 50 | — | — | — | — | — | — | — | 50 | — | — | — | 2 | — | — | — | — | — |
| 16 | — | — | — | 50 | — | — | — | — | — | — | 50 | — | — | — | 2 | — | — | — | — | — |
| 17 | — | — | — | — | 50 | — | — | — | — | — | — | 50 | — | — | 2 | — | — | — | — | — |
| 18 | — | — | — | — | — | 50 | — | — | — | — | — | 50 | — | — | 2 | — | — | — | — | — |
| 19 | — | — | — | — | — | — | 50 | — | — | — | — | 50 | — | — | 2 | — | — | — | — | — |
| 20 | — | — | — | — | — | — | — | 50 | — | — | — | 50 | — | — | 2 | — | — | — | — | — |
| 21 | — | — | — | — | — | — | — | — | 50 | — | — | 50 | — | — | 2 | — | — | — | — | — |
| 22 | — | — | — | — | — | — | — | — | — | 50 | — | 50 | — | — | 2 | — | — | — | — | — |
| 23 | — | — | 50 | — | — | — | — | — | — | — | — | — | 50 | — | 2 | — | — | — | — | — |
| 24 | — | — | — | 50 | — | — | — | — | — | — | — | — | 50 | — | 2 | — | — | — | — | — |
| 25 | — | — | 50 | — | — | — | — | — | — | — | — | — | — | 50 | 2 | — | — | — | — | — |
| 26 | — | — | — | 50 | — | — | — | — | — | — | — | — | — | 50 | 2 | — | — | — | — | — |
| 27 | — | — | 20 | — | — | — | — | — | — | — | 80 | — | — | — | 2 | — | — | — | — | — |
| 28 | — | — | 80 | — | — | — | — | — | — | — | 20 | — | — | — | 2 | — | — | — | — | — |
| 29 | — | — | — | 20 | — | — | — | — | — | — | 80 | — | — | — | 2 | 10 | — | — | — | — |
| 30 | — | — | — | 80 | — | — | — | — | — | — | 20 | — | — | — | 2 | 10 | — | — | — | — |

TABLE 3-continued

| Example No. | Component (a) *1 | | | | | | | | | | Component (b) *2 | | | | Component (c) *3 | Additive *4 | *5 | Conventional compounds *6 | | |
|---|---|---|---|---|---|---|---|---|---|---|---|---|---|---|---|---|---|---|---|---|
| | K | L | C | D | E | F | G | H | I | J | A | B | M | N | | | | X | Y | Z' |
| 31 | — | — | 50 | — | — | — | — | — | — | — | 50 | — | — | — | 1 | — | — | — | — | — |
| 32 | — | — | 50 | — | — | — | — | — | — | — | — | 50 | — | — | 1 | — | — | — | — | — |
| 33 | — | — | 50 | — | — | — | — | — | — | — | 50 | — | — | — | 2 | — | 1 | — | — | — |
| 34 | — | — | — | 50 | — | — | — | — | — | — | — | 50 | — | — | 2 | — | 1 | — | — | — |
| Comparative Example | | | | | | | | | | | | | | | | | | | | |
| 11 | — | — | 10 | — | — | — | — | — | — | — | 90 | — | — | — | 2 | — | — | — | — | — |
| 12 | — | — | 90 | — | — | — | — | — | — | — | 10 | — | — | — | 2 | — | — | — | — | — |
| 13 | — | — | — | 10 | — | — | — | — | — | — | — | 90 | — | — | 2 | — | — | — | — | — |
| 14 | — | — | — | 90 | — | — | — | — | — | — | — | 10 | — | — | 2 | — | — | — | — | — |
| 15 | — | — | 50 | — | — | — | — | — | — | — | 50 | — | — | — | 0.05 | — | — | — | — | — |
| 16 | — | — | 50 | — | — | — | — | — | — | — | 50 | — | — | — | 6.0 | — | — | — | — | — |
| 17 | — | — | — | 50 | — | — | — | — | — | — | — | 50 | — | — | 0.05 | — | — | — | — | — |
| 18 | — | — | — | 50 | — | — | — | — | — | — | — | 50 | — | — | 6.0 | — | — | — | — | — |
| 19 | — | — | — | — | — | — | — | — | — | — | — | — | — | — | 2 | — | — | 50 | — | 50 |
| 20 | — | — | — | — | — | — | — | — | — | — | — | — | — | — | 2 | — | — | — | 50 | 50 |
| 21 | — | — | — | — | — | — | — | — | — | — | — | — | — | — | 2 | — | — | 50 | 50 | — |
| 22 | — | — | — | — | — | — | — | — | — | — | — | — | — | — | 2 | 10 | — | — | 50 | 50 |

Note on Table 3:

*1: Marks K, L, and C to J are compounds having $R_1$ and m in the formulae (3) to (6) as shown in Table 4:

TABLE 4

| Mark | Formula | $R_1$ | m |
|---|---|---|---|
| K | (3) | H | 1 |
| L | (6) | $CH_3$ | 2 |
| C | Equal weight | H | 1 |
| D | mixture of | H | 2 |
| E | (3), (4), (5) | H | 3 |
| F | and (6) | H | 6 |
| G | | $CH_3$ | 0 |
| H | | $CH_3$ | 1 |
| I | | $CH_3$ | 2 |
| J | | $CH_3$ | 6 |

(3)

(4)

(5)

TABLE 4-continued

*2: A, B: See Note on Table 1

*3 to *5: See Note on Table 1.
*6: X, Y: See Note on Table 1.

Z': $CH_2=CH-\underset{\underset{O}{\|}}{C}-O-CH_2CH_2-O-\underset{\underset{O}{\|}}{C}-CH=CH_2$

TABLE 5

| Example No. | Recording sensitivity | Moisture resistance | Heat resistance | Light transmittance (%) | Tensile strength (MPa) | Adhesive properties |
|---|---|---|---|---|---|---|
| Example | | | | | | |
| 13 | o | o | o | 87 | 50 | o |
| 14 | o | o | o | 89 | 51 | o |
| 15 | o | o | o | 87 | 50 | o |
| 16 | o | o | o | 88 | 49 | o |
| 17 | o | o | o | 89 | 50 | o |
| 18 | o | o | o | 90 | 50 | o |
| 19 | o | o | o | 87 | 49 | o |
| 20 | o | o | o | 88 | 50 | o |
| 21 | o | o | o | 90 | 50 | o |
| 22 | o | o | o | 90 | 49 | o |
| 23 | o | o | o | 88 | 49 | o |
| 24 | o | o | o | 90 | 49 | o |
| 25 | o | o | o | 88 | 50 | o |
| 26 | o | o | o | 89 | 50 | o |
| 27 | o | o | o | 88 | 49 | o |
| 28 | o | o | o | 89 | 50 | o |
| 29 | o | o | o | 88 | 49 | o |
| 30 | o | o | o | 90 | 50 | o |
| 31 | o | o | o | 88 | 50 | o |
| 32 | o | o | o | 89 | 50 | o |
| 33 | o | o | o | 88 | 50 | o |
| 34 | o | o | o | 89 | 50 | o |
| Comparative Example | | | | | | |
| 11 | o | o | o | 88 | 28 | o |
| 12 | o | x | x | 88 | 49 | o |
| 13 | o | o | o | 89 | 30 | o |
| 14 | o | x | x | 89 | 49 | o |
| 15 | o | x | x | 88 | 28 | x |
| 16 | o | x | x | 88 | 30 | x |
| 17 | o | x | x | 89 | 29 | x |
| 18 | o | x | x | 89 | 31 | x |
| 19 | x | x | x | 86 | 49 | x |
| 20 | x | x | x | 88 | 47 | x |
| 21 | x | x | x | 87 | 49 | x |
| 22 | x | x | x | 85 | 49 | x |

As is clear from Tables 3 and 5, when the ultraviolet-curable compositions are outside the claimed range, no desirable results are obtained.

As mentioned above, when the special ultraviolet-curable resin composition is used as the primer layer, the resulting optical discs is high in recording sensitivity, high in recording density and high in reliability, and excellent in moisture resistance, heat resistance and adhesive properties between the primer layer and the substrate and between the primer layer and the recording film; and the primer layer is excellent in tensile strength, etc.

What is claimed is:

1. In an optically readable information disc comprising a transparent substrate, a primer layer formed on the substrate and having a relief structure corresponding to information signals to be carried, and a metal-made recording film layer formed on the primer layer, the improvement wherein the primer layer is obtained by curing an ultraviolet-curable resin composition comprising

(a) 20 to 80 parts by weight of a compound of the formula:

(1)

wherein $R_1$ is hydrogen or a methyl group; $R_2$ and $R_3$ are independently hydrogen, or an alkyl group having 1 to 8 carbon atoms; and $R_4$ is

(b) 80 to 20 parts by weight of a compound of the formula:

(2)

wherein $R_1$ and $R_5$ are independently hydrogen or a methyl group; and n is an integer of 5 to 12, and (c) a photopolymerization initiator in an amount of 0.1 to 5.0 parts by weight per 100 parts by weight of the total of the components (a) and (b).

2. An optically readable information disc according to claim 1, wherein $R_4$ in the formula (1) is 3. An optically readable information disc according to claim 1, wherein the compound of the formula (1) is at least one member selected from the group consisting of and wherein $R_1$ is hydrogen or a methyl group; m is zero or an integer of 1 to 8.

4. An optically readable information disc according to claim 3, wherein as the compound of the formula (2) there is used

-continued

5. An optically readable information disc according to claim 1, wherein the compound of the formula (1) is

6. An optically readable information disc according to claim 1, wherein the compound of the formula (1) is and the compound of the formula (2) is

7. An optically readable information disc according to claim 1, wherein the compound of the formula (1) is and the compound of the formula (2) is

8. An optically readable information disc according to claim 1, wherein the compound of the formula (1) is or a mixture thereof.

9. An optically readable information disc according to claim 1, wherein the compound of the formula (1) is or a mixture thereof.